United States Patent
Fidan et al.

(10) Patent No.: US 10,378,129 B2
(45) Date of Patent: *Aug. 13, 2019

(54) BIELASTIC CARBON FIBER CORD AS CAP PLY

(71) Applicant: KORDSA TEKNIK TEKSTIL ANONIM SIRKETI, Izmit (TR)

(72) Inventors: M. Sadettin Fidan, Izmit (TR); Kürsat Aksoy, Izmit (TR); Neslihan Gulbeycan, Izmit (TR)

(73) Assignee: KORDSA TEKNIK TEKSTIL ANONIM SIRKETI, Izmit/Kocaeli (TR)

( * ) Notice: Subject to any disclaimer, the term of this patent is extended or adjusted under 35 U.S.C. 154(b) by 49 days.

This patent is subject to a terminal disclaimer.

(21) Appl. No.: 15/740,375

(22) PCT Filed: Jul. 1, 2016

(86) PCT No.: PCT/TR2016/050214
§ 371 (c)(1),
(2) Date: Dec. 28, 2017

(87) PCT Pub. No.: WO2018/004486
PCT Pub. Date: Jan. 4, 2018

(65) Prior Publication Data
US 2018/0312004 A1    Nov. 1, 2018

(51) Int. Cl.
*D02G 3/48* (2006.01)
*B60C 9/00* (2006.01)
*B60C 9/22* (2006.01)

(52) U.S. Cl.
CPC ............... *D02G 3/48* (2013.01); *B60C 9/005* (2013.01); *B60C 9/0028* (2013.01); *B60C 9/0042* (2013.01); *B60C 2009/0078* (2013.01); *B60C 2009/0092* (2013.01); *B60C 2009/2252* (2013.01); *B60C 2009/2257* (2013.01); *B60C 2009/2285* (2013.01)

(58) Field of Classification Search
CPC .......... B60C 9/0028; B60C 9/005; D02G 3/48
USPC .................................................. 57/236, 237
See application file for complete search history.

(56) References Cited

U.S. PATENT DOCUMENTS

| | | | |
|---|---|---|---|
| 4,749,016 A | 6/1988 | Kojima et al. | |
| 4,893,665 A | 1/1990 | Reuter et al. | |
| 5,558,144 A | 9/1996 | Nakayasu et al. | |
| 6,799,618 B2 | 10/2004 | Reuter et al. | |
| 2003/0201047 A1 | 10/2003 | Rayman et al. | |
| 2005/0051251 A1 | 3/2005 | Sinopoli et al. | |
| 2005/0098253 A1* | 5/2005 | Doujak | D07B 1/062 152/527 |
| 2007/0130905 A1* | 6/2007 | Kish | D02G 3/48 57/237 |

(Continued)

FOREIGN PATENT DOCUMENTS

WO    2014057374 A2    4/2014

*Primary Examiner* — Shaun R Hurley
(74) *Attorney, Agent, or Firm* — Gokalp Bayramoglu

(57) ABSTRACT

A dipped and heat-set carbon fiber cord, including a plurality of cord plies having a spacing between the plurality of cord plies. A TASE at 2.0% elongation of the carbon fiber cord is less than 2.0cN/dtex. The spacing between the plurality of cord plies is longer than 15% and shorter than 80% of a cord diameter of the plurality of cord plies.

6 Claims, 9 Drawing Sheets

(56) References Cited

U.S. PATENT DOCUMENTS

| | | | |
|---|---|---|---|
| 2010/0009116 A1* | 1/2010 | Takeda | B29C 70/16 428/114 |
| 2013/0025758 A1 | 1/2013 | Kim et al. | |
| 2015/0174968 A1* | 6/2015 | Huyghe | B60C 15/04 152/540 |
| 2015/0246580 A1* | 9/2015 | Sevim | B60C 9/0042 442/182 |
| 2018/0313004 A1* | 11/2018 | Fidan | B60C 1/0016 |
| 2019/0030956 A1* | 1/2019 | Fidan | B60C 1/0016 |

* cited by examiner

BIELASTIC CARBON FIBER CORD AS CAP PLY

CROSS REFERENCE TO RELATED APPLICATIONS

This application is the national phase entry of International Application No. PCT/TR2016/050214, filed on Jul. 1, 2016, the entire content of which is incorporated herein by reference.

TECHNICAL FIELD

The present invention relates to a novel tire cord reinforcement made of ultra high modulus carbon fibers which has bi-elastic tensile properties. Such a novel bi-elastic tire cord improves high speed durability and eliminates flatspotting when used as cap ply in pneumatic radial tires.

BACKGROUND OF THE INVENTION

Under high speed conditions, the outer diameter of the tire increases due to centrifugal forces generated by steel cord belt package and tread. Such a diameter increase or tire growth increases the pantographic movements of the belt edge cords leading to the crack initiations, crack propagations and finally belt edge separations.

The cap ply layer wound on belt package circumferentially prevent excessive tire growth under high speed conditions by applying compressive forces (restraining force) on heavy belt package made of cross ply steel cord layers.

Currently, most widely used cap ply materials are multiply nylon 6.6 layers or single layer hybrid cords which are spirally wound on belt package at 0 to 5 degrees to equatorial plane of the tire.

Nylon cords have excellent fatigue resistance under bending and axial compression, and bielastic tensile characteristic enabling easy processing during tire building. Additionally, shrink force generation with increasing service temperature under high speed conditions improves belt edge separation resistance and high speed durability. But low glass transition temperature of nylon cause flatspot problems in tire during parking after high speed driving. Other potential drawback of multiply nylon cap ply assembly is its high rubber content which cause to increase the rolling resistance of the tire by hysteresis (heat build up).

It is well known the hybrid cords comprising high and low modulus yarns having bi-elastic tensile behaviour are also widely used as cap ply in high speed tires. The low modulus component of hybrid cord enables easy belt package lifting without tight cord formation due to its high extensibility and the high modulus component becomes effective in service conditions. By using hybrid cords as cap ply, the total thickness of the cap ply layer and rubber content can be reduced, and the high modulus component of the hybrid cord improves the restraining force and high speed durability. But existence of nylon cause also some flatspot.

On the other hand, the cords made of ultra high modulus yarns having high twist have been also used as tire reinforcement to eliminate flatspot and improve high speed performance, but high level of cord twist results in drastic modulus and beaking strength losses.

U.S. Pat. No. 4,893,665 describes a hybrid cord comprising at least two yarn each of which consists only of aramid filaments, and a single core yarn which consists only of filaments selected from the group consisting of polyamides having a structure which is at least partially oriented and polyesters having a structure which is at least partially oriented.

U.S. Pat. No. 5,558,144 describes hybrid cord having high modulus aramid and low modulus nylon wound spirally and continuously on belt package in the circumferential direction of the tire at an angle of 0 to 3 degrees with respect to the equatorial plane.

U.S. Pat. No. 6,799,618 describes a textile cap ply structure which is superimposed radially outwardly to the belt assembly is reinforced with cords being made of materials including nylon and aramid. At initial elongation of the cords, the primary load bearing yarns are nylon yarns, and after appreciable elongation the primary load bearing yarns are the aramid yarns.

US Patent No. 2013/0025758 describes a high performance pneumatic radial tire for passenger cars which uses a hybrid cord composed of two ply aramid yarn and single ply nylon yarn having different twist counts for the first twist and different twist counts for the second twist, as a cap ply, and thereby has improved high speed durability and steering stability.

SUMMARY OF INVENTION

The invention provides a two or more ply cord reinforcement made of carbon fiber yarn having bielasic tensile properties. Namely, low initial modulus and high modulus after initial elongation. In order to prevent excessive modulus and breaking strength losses, high level of cord twisting has been avoided.

The production principle of the transformation of linear tensile behaviour of the carbon fiber cord to bielastic characteristic is based on the opening the cord plies and insertion of RFL adhesive in it. The carbon fiber cord having RFL between its opened plies shows bielastic tensile behaviour under tension.

Definitions

Cord: The product formed by twisting together two or more plied yarns

Cord ply: Plied single yarns within cord.

Dtex: The gram weight of yarn having 10,000 meter length.

Flatspotting: Cords in tire having low Tg and high thermal shrik force is subjected to shrinkage at footprint. When cooled in this position, the cord maintains flatspot until it again reaches its Tg in use.

Greige cord: Twisted cord before dipping and heat-setting

Heat-setting: The process of conferring dimensional stability and heat resistance to the yarns, cords or fabrics by means of either moist or heat.

Heat-set cord: Cord exposed to high temperature (e.g. 120° C. to 260° C. under tension)

Linear density: Weight per unit length as g/dtex or g/d (denier)

Spacing(s): Mutual ply-to-ply distance within a multi-ply twisted cord

TASE at 2% elongation: Stress at 2% elongation as cN/dtex

Tg: Glass transition point of polymer

Total nominal cord dtex: Sum of nominal yarn linear densities (3340 dtex for 1670×2 cord)

Twist: Number of turns about its axis per meter of a yarn or cord (t/m or tpm)

Ultra high modulus yarn: Tensile modulus higher than 100 GPa

BRIEF DESCRIPTION OF THE DRAWINGS

FIG. 7A-7J describe the opening of the cord cross sections and subsequent dip penetration between the cord plies for two and three-ply carbon fiber cords, in which FIG. 7A and FIG. 7D are respectively cross-sectional views of two and three-ply carbon fiber cords in closed-plies form, FIG. 7B and FIG. 7E are respectively cross-sectional views of two and three-ply carbon fiber cords in opened-plies form, FIG. 7C and FIG. 7F are respectively cross-sectional views of two and three-ply carbon fiber cords in dip impregnated form according to the invention.

FIGS. 7G-7J are respectively adhesive dip (RFL) filling the openings between the plies and covering the cord surface.

curve 3 is 2000 dtex/2 carbon fiber cord having Z/S 200/200 tpm twist, axially compressed and cord plies are opened during dipping process having bielastic tensile characteristic according to invention.

DETAILED DESCRIPTION OF THE INVENTION

Figure 1:
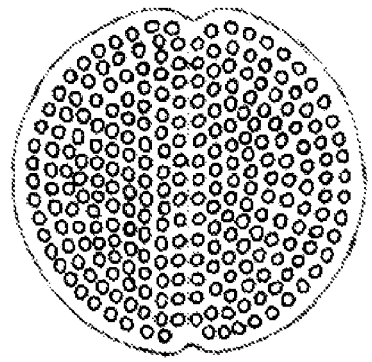
FIG. 1 is a cross-sectional view of a conventional (prior art) two-ply carbon fiber cord.
Figure 2:
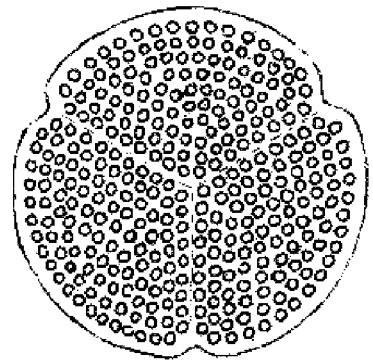
FIG. 2 is a cross-sectional view of a conventional (prior art) three-ply carbon fiber cord.

Carbon fiber with its ultra high modulus and high strength is very dimensionally stable material. Due to its highly crystalline microstructure, it does not show any significant thermal shrinkage when exposed to high temperature. In twisted form as two or three-ply cord, it can be used as reinforcement in tires and mechanical rubber goods like V-belts (FIG. 1 and FIG. 2). In V-belt applications, in order to prevent fiber-fiber frictions and improve bending fatigue resistance, the fibers are totally impregnated (full penetration) with adhesive elastomers.

The cord twisting improves bending and compression fatigue resistance of the carbon fiber, but at the same time reduces the modulus and strength too.

In zero degree cap ply applications in pneumatic radial tires, the high modulus is needed for restraining force to prevent belt edge separations under high speed conditions, but initial extensibility with low forces (initial low modulus) is also needed for processability during lifting of belt package in tire building and curing processes to avoid cord cuttings through the belt skim compound.

Figure 3:
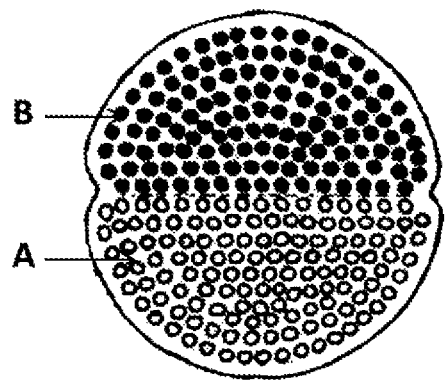
FIG. 3 is a cross-sectional view of a conventional (prior art) two-ply hybrid cord in which, A is aramid or carbon fiber ply (yarn), B is nylon ply (yarn).
Figure 4:
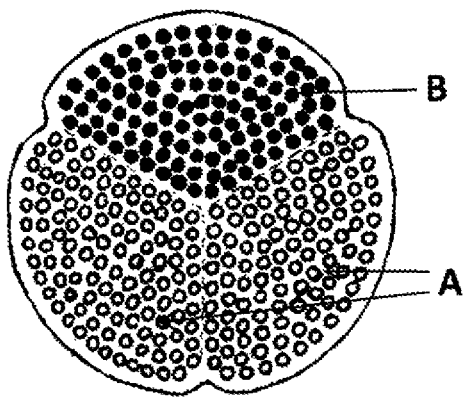
FIG. 4 is a cross-sectional view of a conventional (prior art) three-ply hybrid cord in which, A is aramid ply (yarn) and, B is nylon ply (yarn).

Aramid/Nylon hybrid cords may solve this issue, but existence of nylon creates flatspot problem and asymmetric cord structure (FIG. 3 and FIG. 4)

Figure 5:
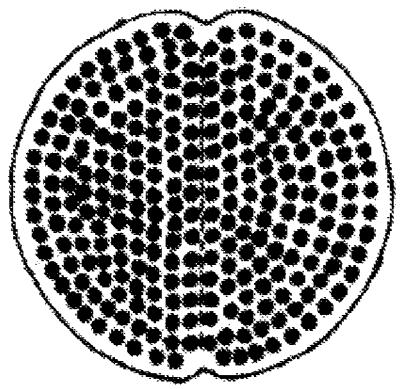
FIG. 5 is a cross-sectional view of a conventional (prior art) two-ply nylon cord.
Figure 6:
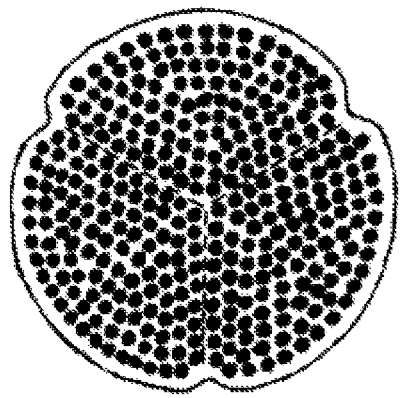
FIG. 6 is a cross-sectional view of a conventional (prior art) three-ply nylon cord.
Figure 7A:
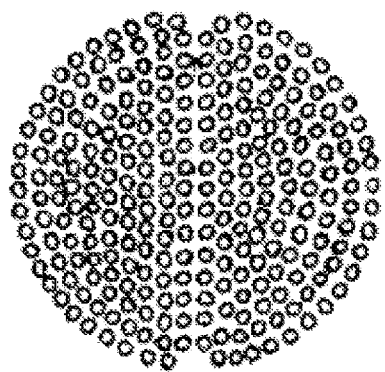
Figure 7D:
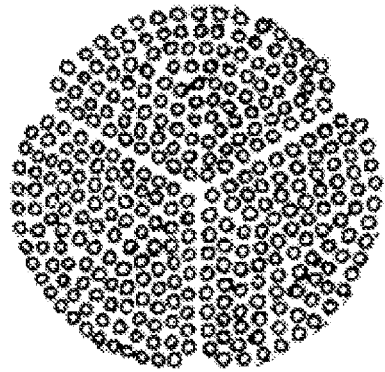
Figure 7B:
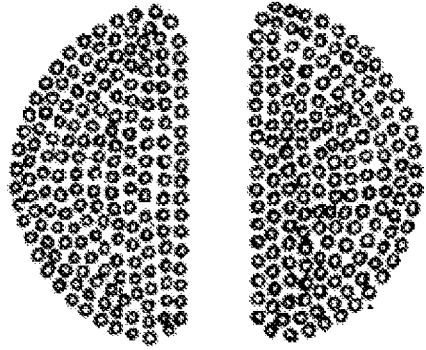
Figure 7E:
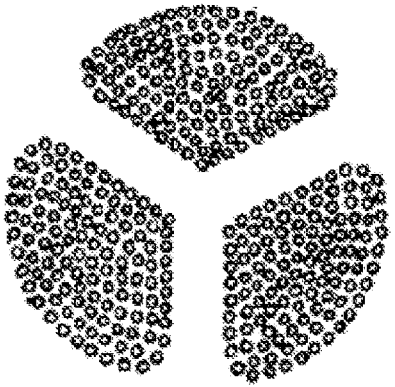
Figure 7C:
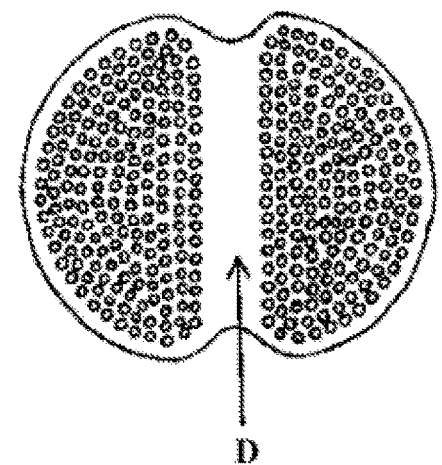
Figure 7F:
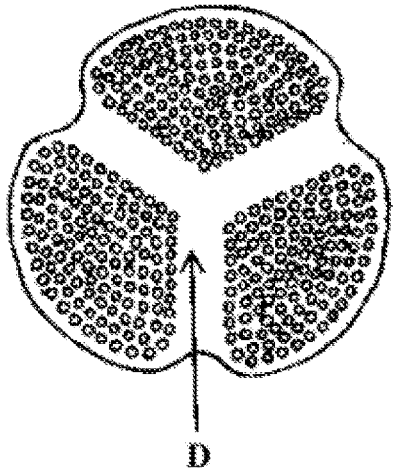
Figure 7G:
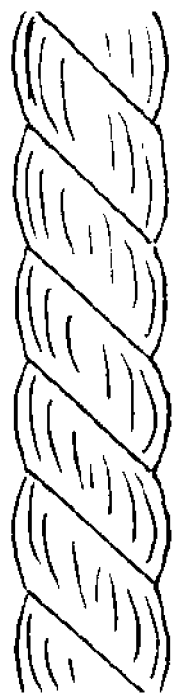
Figure 7H:
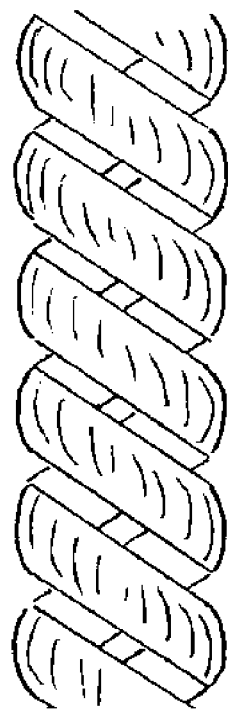
Figure 7I:
Figure 7J:
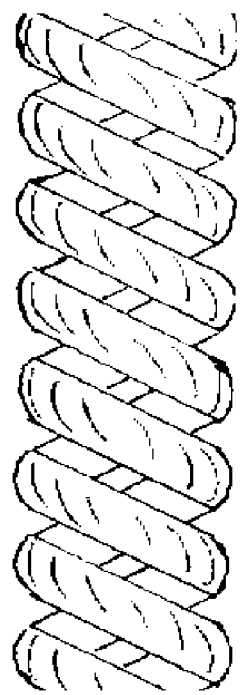
Figure 8A:
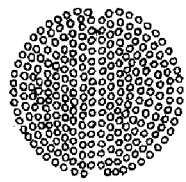
FIG. 8A are respectively lateral and cross-sectional view of conventional two-ply carbon fiber cord.
Figure 8B:
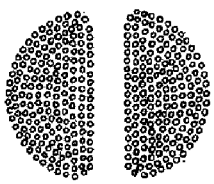
FIG. 8B are respectively lateral and cross-sectional view of two-ply carbon fiber cord in opened form according to invention (before dipping step).
Figure 9A:
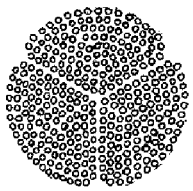
FIG. 9A are respectively lateral and cross-sectional view of conventional three-ply carbon fiber cord FIG. 9B are respectively lateral and cross-sectional view of three-ply carbon fiber cord in opened form according to invention (before dipping step).
Figure 9B:
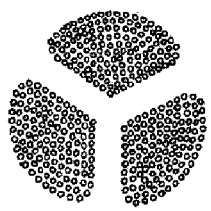

Two or three-ply nylon 6 and 6.6 cords (FIG. 5 and FIG. 6) are well known reinforcements as cap ply in radial passenger car and light truck tires, but flatspot and low level of modulus are their major drawbacks.

According to the present invention, two or more ply carbon fiber cords without any low modulus component ply like nylon, and having higher tensile modulus than aramid can be produced with bielastic tensile properties (FIG. 7A-7J). Such novel bi-elastic carbon fiber cords can be used as as zero degree cap ply in radial tires to improve high speed durability and do not show any flatspotting.

Figure 11:
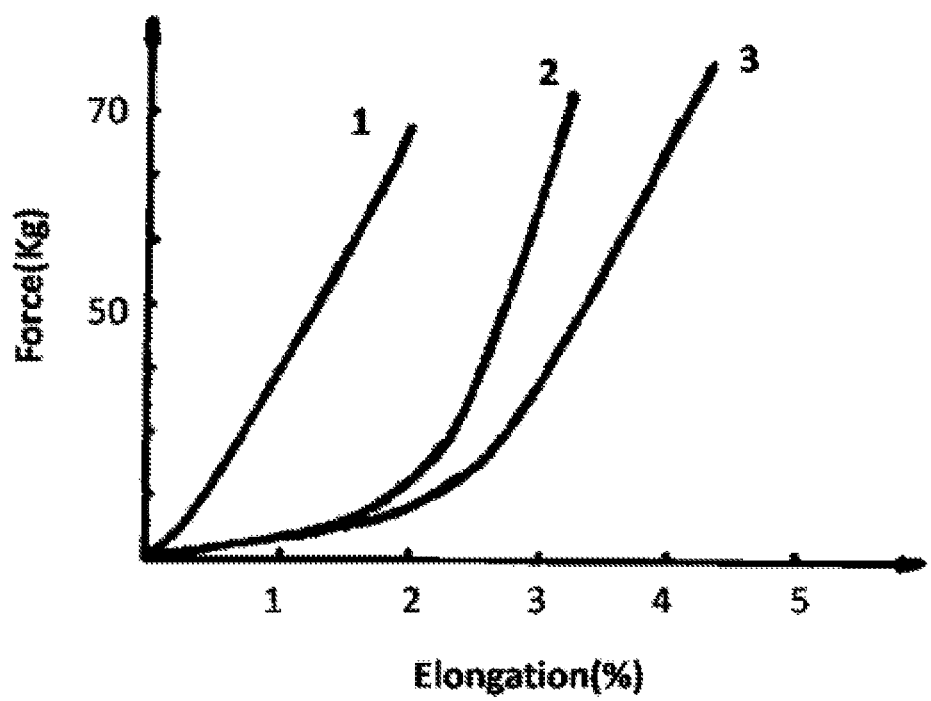
FIG. 11 shows load-elongation curves of carbon fiber cords in which, curve 1 is 2000 dtex/2 dipped carbon fiber cord having Z/S, 200/200 tpm twist (prior art) having linear tensile characteristic, curve 2 is 2000 dtex/2 carbon fiber cord having Z/S, 200/160 tpm (40 tpm back-twisted in Z direction) and dipped having bielastic tensile characteristic according to invention.

According to the invention, the basic production principle of the bielastic carbon fiber cord is to open the cord plies and insertion of the adhesive dip between the plies. The carbon fiber cord containing high percentage of adhesive dip like RFL between its plies becomes extensible with low forces and during this extension the carbon fiber cord plies apply compressive forces to the adhesive material (RFL) and squeeze it. During this squeezing process cord elongates with low forces. After carbon fiber cord plies having been approached to each other, carbon fiber cord resist to elongation and it becomes ultra high modulus cord again (FIG. 11).

In order to obtain a bielastic tensile characteristics, the carbon fiber cord plies can be opened with different methods:

a—The two or more ply greige carbon fiber cords are heat-set at a temperature between 120° C. and 260° C. and after cooling down they are partially back-twisted in opposite direction of cord twist. During this back-twisting process, the cord plies are opened (FIG. 8A, FIG. 8B, FIG. 9A, FIG. 9B, FIG. 10A, FIG. 10B, FIG. 10C and FIG. 10D) The carbon fiber cords with its opened plies are dipped and heat set again, and during this process the voids between cord plies are filled with dip solution and the external surface of the cord plies are also covered dip solution.

b—The two or more ply greige carbon fiber cords are dipped and heat-set at a temperature between 120° C. and 260° C. and after cooling down they are partially back-twisted in opposite direction of cord twist. During this back-twisting process, the cord plies are opened. The carbon fiber cords with their opened plies are dipped and heat set again, and during this process the voids between cord plies are filled with dip solution and the external surface of the cord plies are also covered additional dip solution.

c—The two or more ply carbon fiber cords are subjected to axial compression during dipping process, and the cord with opened plies under compression absorbs dip solution between the open cord plies. After dipping process, the carbon fiber cord with penetrated dip solution between the plies are dried and heat set between 120° and 260° C.

Figure 10A:
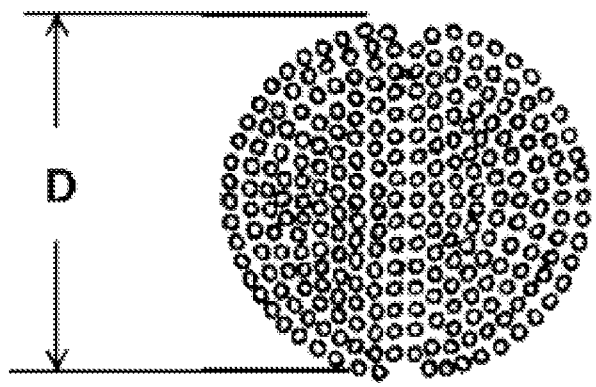
FIG. 10A, FIG. 10B, FIG. 10C and FIG. 10D are cross-sectional views of closed and opened forms of cord plies. D is cord diameter and s is spacing (opening) between cord plies.
Figure 10B:
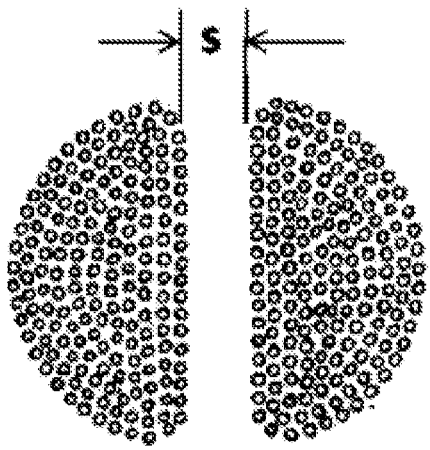
Figure 10C:
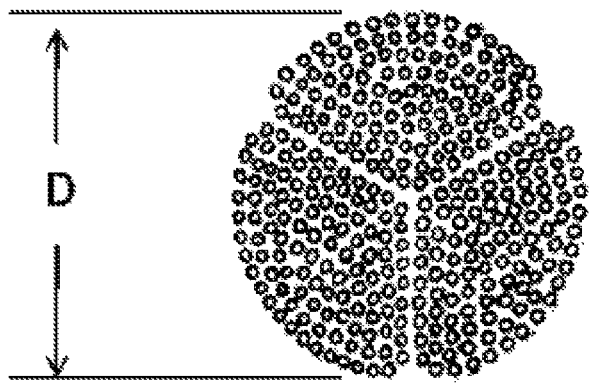
Figure 10D:
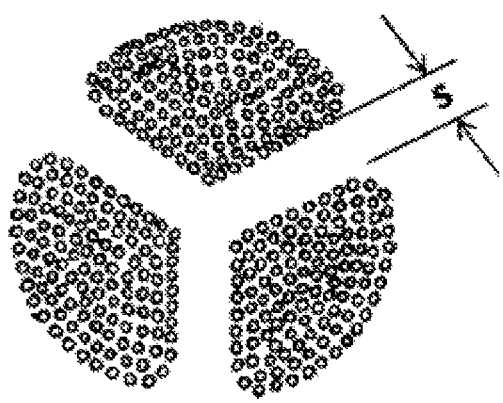

The tensile bielasticity characteristic of the carbon fiber cord can changed with the ply opening degree(s) in FIG. 10B and FIG. 10D, dip type, dip content between the plies and the curing degree of the dip at high temperature (dip hardness).

According to invention, two or more ply carbon fiber cord has less than 2.0 cN/dtex TASE value at 2% elongation determined in accordance with ASTM D885-16 and the spacing(s) between the cord plies which is filled with adhesive dip, is higher than 0.15×D and less than 0.8×D.

2% TASE higher than 2.0 cN/dtex cause tight cords when applied as cap ply during process lifting of the tire.

Preferably, s is higher than 0.2×D and less than 0.5×D.

According to the invention, the dip pick up (DPU) in the dipped cord is higher than 20% and less than 50%, preferably, higher than 25% and less than 35%, by weight.

Less than 10% DPU can not totally fill the the openings between the cord plies, and higher than 50% DPU leads to too thick cord diameters.

According to invention, the twist factor of the cord is higher than 12,000 and less than 20,000 which is determined based on the following formula;

$$\text{Twist factor} = \text{cord twist(tpm)} \times \text{square root of total nominal cord dtex} \quad (1)$$

The cords with lower than 12,000 twist factor have insufficient fatigue resistance under bending and the cords with higher than 20,000 twist factor have significant modulus reductions.

According to invention, the total nominal cord linear density is higher than 200 dtex and less than 5000 dtex.

The cords having less than 200 dtex are not effective enough, and the cords having higher than 5,000 dtex are too thick.

What is claimed is:

1. A dipped and heat-set carbon fiber cord, comprising a plurality of cord plies having a spacing between the plurality of cord plies, wherein a TASE at 2.0% elongation of the carbon fiber cord is less than 2.0 cN/dtex;
   wherein the spacing between the plurality of cord plies is more than 15% and less than 80% of a cord diameter of the plurality of cord plies.

2. The dipped and heat-set carbon fiber cord according to claim 1, wherein the spacing between the plurality of cord plies of the cord is more than 20% and less than 50% of the cord diameter.

3. The dipped and heat-set carbon fiber cord according to claim 1, wherein an adhesive dip pick-up (DPU) of the carbon fiber cord is higher than 20% and less than 50% by weight.

4. The dipped and heat-set carbon fiber cord according to claim 1, wherein an adhesive dip pick-up (DPU) of the carbon fiber cord is higher than 25% and lower than 35% by weight.

5. The dipped and heat-set carbon fiber cord according to claim 1, wherein the carbon fiber cord has a twist factor in between 12,000-20,000, wherein the twist factor is calculated according to the following formula (1):

$$\text{twist factor} = \text{cord twist(tpm)} \times \text{square root of total nominal cord dtex} \quad (1).$$

6. The dipped and heat-set carbon fiber cord according to claim 1, wherein the carbon fiber cord has a total nominal linear density in between 200 dtex and 5,000 dtex.

* * * * *